(12) United States Patent
Li et al.

(10) Patent No.: US 11,415,950 B2
(45) Date of Patent: Aug. 16, 2022

(54) ARTIFICIAL NEURAL NETWORK CONTROL SYSTEM FOR AUTONOMOUS VOLT/VAR CONTROL OF INVERTER IN INTERFACED UNITS

(71) Applicant: THE BOARD OF TRUSTEES OF THE UNIVERSITY OF ALABAMA, Tuscaloosa, AL (US)

(72) Inventors: Shuhui Li, Northport, AL (US); Yang Sun, Tuscaloosa, AL (US); Malek Ramezani, Tuscaloosa, AL (US); Yang Xiao, Tuscaloosa, AL (US)

(73) Assignee: THE BOARD OF TRUSTEES OF THE UNIVERSITY OF ALABAMA, Tuscaloosa, AL (US)

( * ) Notice: Subject to any disclaimer, the term of this patent is extended or adjusted under 35 U.S.C. 154(b) by 537 days.

(21) Appl. No.: 16/548,291

(22) Filed: Aug. 22, 2019

(65) Prior Publication Data
US 2020/0064782 A1 Feb. 27, 2020

Related U.S. Application Data

(60) Provisional application No. 62/722,350, filed on Aug. 24, 2018.

(51) Int. Cl.
*G05B 13/02* (2006.01)
*G06N 3/04* (2006.01)
(Continued)

(52) U.S. Cl.
CPC ......... *G05B 13/027* (2013.01); *G06N 3/0445* (2013.01); *G06N 3/08* (2013.01);
(Continued)

(58) Field of Classification Search
CPC ...... G05B 13/027; G06N 3/0445; G06N 3/08; H02J 3/18; H02J 3/32; H02J 3/383;
(Continued)

(56) References Cited

U.S. PATENT DOCUMENTS

2018/0238951 A1* 8/2018 Tao ..................... G06K 9/6269
2020/0106432 A1* 4/2020 Wang ....................... H03K 7/08

OTHER PUBLICATIONS

Smart Grid Investment Grant Program, "Application of Automated Controls for Voltage and Reactive Power Management—Initial Results," U.S. Department of Energy, Dec. 2012, 40 pages.
(Continued)

*Primary Examiner* — Daniel Cavallari
(74) *Attorney, Agent, or Firm* — Meunier Carlin & Curfman LLC

(57) ABSTRACT

A system is described herein for controlling an inverter comprising an artificial neural network (ANN) and a space vector pulse-width modulation converter. The ANN comprises an input layer, plurality of hidden layers, an output layer, and a processor. The ANN receives a plurality of input signals and produces output signals that control a SVPWM converter. The ANN is trained to minimize a cost function and to implement optimal control based on ADP. Further, the ANN can be configured to handle rated current and PWM saturation constraints in providing volt/VAR control functions. Finally, the ANN uses averaged feedback signals instead of instantaneous feedback signals to improve volt/VAR control performance of parallel inverters. Performance evaluation shows that an ANN controller has a strong ability to maintain volt and VAR control at the grid edge and prevent fighting between inverters thereby allowing an inverter to work effectively in parallel with other ANN-controlled inverters.

16 Claims, 14 Drawing Sheets

(51) Int. Cl.
G06N 3/08 (2006.01)
H02M 7/5395 (2006.01)
H02J 3/18 (2006.01)
H02M 1/42 (2007.01)
H02J 3/32 (2006.01)
H02J 3/38 (2006.01)

(52) U.S. Cl.
CPC .............. H02J 3/18 (2013.01); H02M 1/42 (2013.01); H02M 7/5395 (2013.01); *H02J 3/32* (2013.01); *H02J 3/383* (2013.01); *H02J 3/386* (2013.01); *H02J 3/387* (2013.01)

(58) Field of Classification Search
CPC .. H02J 3/386; H02J 3/387; H02J 3/322; H02J 2300/22; H02J 2310/10; H02J 3/381; H02M 1/42; H02M 7/5395; H02M 1/0012; H02M 1/4216; H02M 7/493; H02M 7/53873; Y02B 70/10; Y02B 70/3225; Y02E 10/56; Y02E 10/76; Y04S 20/222
See application file for complete search history.

(56) References Cited

OTHER PUBLICATIONS

National Electrical Manufacturers Association, "Volt/VAR Optimization Improves Grid Efficiency," available at htlps://www.nema.org/Policy/Enery/Smartgtrid/Documents/VoltVAR-Optimazation-Improves%20Grid-Efficienev.pdf 12 pages.
D. Dohnal, "On-Load Tap-Changers for Power Transformers," available at http://wwwreinhausen.com/XparoDownload.ashx?, 2013, 24 pages.
L. Kojovic, "Impact of DG on voltage regulation," Proc. IEEE Power Engineering Society Summer Meeting, Chicago, IL, USA, 2002.
C. Dai and Y. Baghzouz, "Impact of distributed generation on voltage regulation by LTC transformer," Proc. 11th Int. Conf, on Harmonics and Quality of Power, Lake Placid, NY, USA, 2004.
P. P. Barker and R. W. De Mello, "Determining the impact of distributed generation on power systems. I. Radial distribution systems," Proc. IEEE PES Summer Meeting, Seattle, WA, 2000, pp. 1645-1656.
R. W. Uluski, "VVC in the Smart Grid era," Proc. IEEE Power and Energy Society General Meeting, Minneapolis, MN, Jul. 26-29, 2010.
M. Manbachi, M. Nasri, B. Shahabi, H. Farhangi, A. Palizban, S. Arzanpour, M. Moallem, and D.C. Lee. "Real-time adaptive VVO/CVR topology using multi-agent system and IEC 61850-based communication protocol." IEEE Trans. Sustainable Energy, 5(2), (2014): 587-597.
J. E. Mendoza, D. A. Morales, R. A. Lopez, E. A. Lopez, J. C. Vannier, and C. A. C. Coello, "Multiobjective location of automatic voltage regulators in a radial distribution network using a micro genetic algorithm," IEEE Trans. Power Syst., 22(1), (2007): 404-412.
B.A. de Souza and A.M.F de Almeida. "Multiobjective optimization and fuzzy logic applied to planning of the volt/var problem in distributions systems." IEEE Trans. Power Systems, 25.3 (2010): 1274-1281.
R. Moghe, D Tholomier, D Divan, J Schatz, and D. Lewis. "Grid Edge Control: A new approach for volt-var optimization." Proc. Transmission and Distribution Conference and Exposition, pp. 1-5. IEEE, 2016.
P. Jahangiri and D.C. Aliprantis. "Distributed Volt/VAr control by PV inverters," IEEE Trans. Power Syst. vol. 28, No. 3 (2013): 3429-3439.
E. Ghiani and P.I.L.O. Fabrizio, "Smart inverter operation in distribution networks with high penetration of photovoltaic systems," J. Modern Power Syst. and Clean Energy, 3(4), (2015): 504-511.
F. Bell, A. Nguyen, M. McCarty, K. Atef, and T. Bialek, "Secondary voltage and Yeactive power support via smart inverters on a high-penetration distributed photovoltaic circuit," Proc. Innovative Smart Grid Technologies Conference (ISGT), pp. 1-6. IEEE, 2016.
D. Divan, R Moghe, and A Prasai. "Power Electronics at the Grid Edge: The key to unlocking value from the smart grid," IEEE Power Electronics Mag., 1(4), (2014): 16-22.
A.J. Wood, B.F. Wollenberg and G.B. Sheble, Power Generation, Operation and Control, 3rd Ed., John Wiley & Sons Inc., 2014, 11 pages.
S. Li, T.A. Haskew, Y. Hong, and L. Xu, "Direct-Current Vector Control of Three-Phase Grid-Connected Rectifier-Inverter," Electric Power System Research, 81(2), (2011): 357-366.
S. Li, M. Fairbank, C. Johnson, D.C. Wunsch, E. Alonso, and J. Proano, "Artificial Neural Networks for Control of a Grid-Connected Rectifier/Inverter under Disturbance, Dynamic and Power Converter Switching Conditions", IEEE Trans. Neural Netw. Learn. Syst., 25(4), (2014): 738-750.
A. Luo, C. Tang, Z. Shuai, J. Tang, X. Xu, and D. Chen, "Fuzzy-PI-Based Direct-Output-Voltage Control Strategy for the STATCOM Used in Utility Distribution Systems," IEEE Trans. Ind. Electron., 56(7), (2009): 2401-2411.
J. Dannehl, C. Wessels, and F.W. Fuchs, "Limitations of Voltage-Oriented PI Current Control of Grid-Connected PWM Rectifiers with LCL Filters," IEEE Trans. Ind. Electron., 56(2), (2009): 380-388.
X. Fu, S. Li, M. Fairbank, D. C. Wunsch, and E. Alonso, "Training recurrent neural networks with the Levenberg-Marquardt algorithm for optimal control of a grid-connected converter," IEEE Trans. Neural Netw. Learn. Syst., 26(9), (2015): 1900-1912.
Z. Li, C. Zang, P. Zeng, H. Yu, S. Li and X. Fu, "Mixed $H2/H\infty$ Optimal Control for Three-phase Grid Connected Converter," International Journal of Electronics, vol. 104, No. 6, pp. 775-791, 2017.
J., Rodriguez, J. Pontt, C.A. Silva, P. Correa, P. Lezana, P. Cortés, and U. Ammann. "Predictive current control of a voltage source inverter." IEEE Trans. Ind. Electron., 54( 1), (2007): 495-503.
S. Li, T.A. Haskew and L. Xu, "Control of HVDC light system using conventional and direct current vector control approaches," IEEE Trans. Power Electron., 25(12), (2010): 3106-3118.
D. Lee and G. Lee, "A novel overmodulation technique for space-vector PWM inverters," IEEE Trans. Power Electron., 13(6), (1998): 1144-1151.
Y. C. Kwon, S. Kim and S. K. Sul, "Six-Step Operation of PMSM With Instantaneous Current Control," IEEE Trans. Ind. Appl., 50(4), (2014): 2614-2625.
S. Papathanassiou, N. Hatziargyriou, and K. Strunz, "A Benchmark Low Voltage Microgrid Network", Proc. CIGRE Symposium: Power Systems with Dispersed Generation, Apr. 2005, Athens, Greece.
R.W. Uluski, "Volt/var control and optimization concepts and issues," Electric Power 15 Research Institute (EPRI), 2011.
Y. Liu, P. Zhang, and X. Qiu, "Optimal volt/var control in distribution systems," Int. J. Electrical Power and Energy Syst., vol. 24, No. 4, pp. 271-276, 2002.
S. Naka, T. Genji, T. Yura, and Y. Fukuyama, "A hybrid particle swarm optimization for distribution state estimation," IEEE Trans. Power Syst., vol. 18, No. 1, pp. 60-68, 2003.
M. Biserica, Y. Besanger, R. Caire, O. Chilard, and P. Deschamps, "Neural networks to improve distribution state estimation-Volt var control performances," IEEE Trans. Smart Grid., vol. 3, No. 3, pp. 1137-1144, Sep. 2012.
H. Zhu and H. 5 J. Liu, "Fast Local Voltage Control Under Limited Reactive Power: Optimality and Stability Analysis," IEEE Trans. Power Syst., vol. 31, No. 5, pp. 3794-3803, Sep. 2016.
H. J. Liu, W. Shi, and H. Zhu, "Distributed Voltage Control in Distribution Networks: Online and Robust Implementations," IEEE Trans. Smart Grid., in press, available online @IEEE Xplore.
IEEE 1547-2018, IEEE, 3 Park Avenue, New York, NY 10016-5997, USA, Apr. 2018.

(56) References Cited

OTHER PUBLICATIONS

J.M. Guerrero, J.C. Vasquez, J. Matas, L.G. De Vicuna, and M. Castilla, "Hierarchical control of droop-controlled AC and DC microgrids-A general approach toward standardization," IEEE Trans. Ind. Electron., vol. 58, No. 1, pp. 158-172, Jan. 2011.

D.V. Prokhorov, L.A. Feldkamp, and I.Y. Tyukin. "Adaptive behavior with fixed weights in RNN: an overview," Proc. 2002 IEEE Int. Joint Conf, on Neural Networks, pp. 2018-2023, 2002.

A. Thomas, "dSPACE DS 1103 Control Workstation Tutorial and DC Motor Speed Control," Senior Project Report, Bradley University ECE Department, May 11, 2009.

S. Li, Y. Sun, M. Ramezani and Y. Xiao, "Artificial Neural Networks for Volt/VAR Control of DER Inverters at the Grid Edge," in IEEE Transactions on Smart Grid, vol. 10, No. 5, pp. 5564-5573, Sep. 2019. doi: 10.1109/TSG.2018.2887080.

* cited by examiner

ARTIFICIAL NEURAL NETWORK CONTROL SYSTEM FOR AUTONOMOUS VOLT/VAR CONTROL OF INVERTER IN INTERFACED UNITS

CROSS REFERENCE TO RELATED APPLICATION

This application claims priority to and benefit of U.S. Provisional Patent Application Ser. No. 62/722,350 filed Aug. 24, 2018, which is fully incorporated by reference and made a part hereof, including its appendix.

BACKGROUND

Voltage and VAR control (VVC) is essential to electrical utilities' ability to deliver power. VVC has become increasingly complicated with increased grid penetration of distributed energy resources (DERs), which are typically located at the grid edge. It is therefore desirable to use DER inverters to provide for fast VVC along the grid edge. The use of decentralized "smart inverters" has created control problems, including the problem of inverters "fighting" one another. For example, when two DER inverters in parallel are controlling the AC voltage, one inverter will tend to increasingly generate reactive power. Meanwhile, the other inverter will tend to increasingly supply reactive power. This "fighting" continues until both are over capacity and trip the protection.

In radial distribution networks, electromechanical devices have conventionally been used for VVC. These systems use switched capacitor banks, voltage regulators, and power transformers with on-load tap changers for gross adjustments when performing VVC. However, the effectiveness of these conventional VVC techniques is reduced in the presence of DERs.

Droop control schemes have also conventionally been applied to the problem of voltage control, but droop control does not have the advantages of a decentralized, distributed, and communication-less ac bus voltage control. Further, conventional controls technologies become unstable when operating beyond the physical constraints of the inverters. Therefore, droop control alone, without high-level control coordination/communication, is unable to maintain a stable ac bus voltage autonomously. This has prevented the successful application of conventional control techniques to volt and VAR control at the grid edge.

Therefore, systems and methods are desired that overcome challenges in the art, some of which are described above. Specifically, an artificial neural network (ANN) control system that can provide for VVC at the grid edge is desired.

SUMMARY

Described and disclosed herein is a method for volt and VAR control using an inverter, and an ANN Control System that can provide autonomous volt and VAR control at the grid edge. Disclosed herein are approaches to implementing approximate dynamic programming (ADP)-based optimal control based on ANN for volt and VAR control of inverter interfaced DERs at the grid edge; mechanisms to train the ANN within the ADP control system; an investigation and comparison of embodiments of the ANN-based ADP vector controller with conventional vector controllers; and a hardware experiment validation and comparison. Embodiments of the disclosed ANN control system can perform the following to achieve autonomous volt and VAR control of parallel and distributed DER inverters at the grid edge:

First, the disclosed ANN control system can automatically detect the condition whether a DER inverter has reached rated current constraint. If so, the ANN control system operates based on a strategy to maintain the effectiveness of the active power control of the DER unit while providing volt or VAR control as close as possible to the demanded value, and at the same time lock the volt/VAR controller.

Second, when a DER inverter operates at the rated current condition, the ANN control system can detect whether there is a potential that the DER inverter will operate below the rated current. If so, the ANN control system returns to its normal control condition to provide demanded active and volt/VAR control, and at the same time liberate the volt/VAR controller.

Further, the ANN control system can automatically detect the condition whether a DER inverter has reached a pulse-width modulation (PWM) saturation constraint. If so, the ANN control system operates based on a strategy to maintain the effectiveness of the active power control of the DER unit while providing volt or VAR control as close as possible to the demanded value, and at the same time lock the volt/VAR controller and ANN q-axis control loop.

Also, when a DER inverter operates at the PWM saturation condition, the ANN control system can detect whether there is a potential that the DER inverter will operate below the PWM saturation constraint. If so, the ANN control system returns to its normal control condition to provide demanded active and volt/VAR control, and at the same time liberate the volt/VAR controller and ANN q-axis control loop.

And, the ANN control system combines with space vector pulse-width modulation (SVPWM) that is suitable to operate a DER inverter not only in linear-modulation region but also in over-modulation region temporarily to meet short-term, transient volt and VAR control needs.

Finally, instead of using instantaneous voltage or reactive power feedback signal, the ANN control system uses voltage or reactive power feedback signal that is averaged over a short time period to achieve volt and VAR control ability.

Embodiments of the ANN control system disclosed herein integrate at least all the above techniques to overcome existing challenges of fighting among parallel DER inverters in autonomous volt/VAR control conditions and provide a low-cost volt control technique to better meet IEEE 1547 voltage regulation requirement on DERs.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

DETAILED DESCRIPTION

Figure 1:
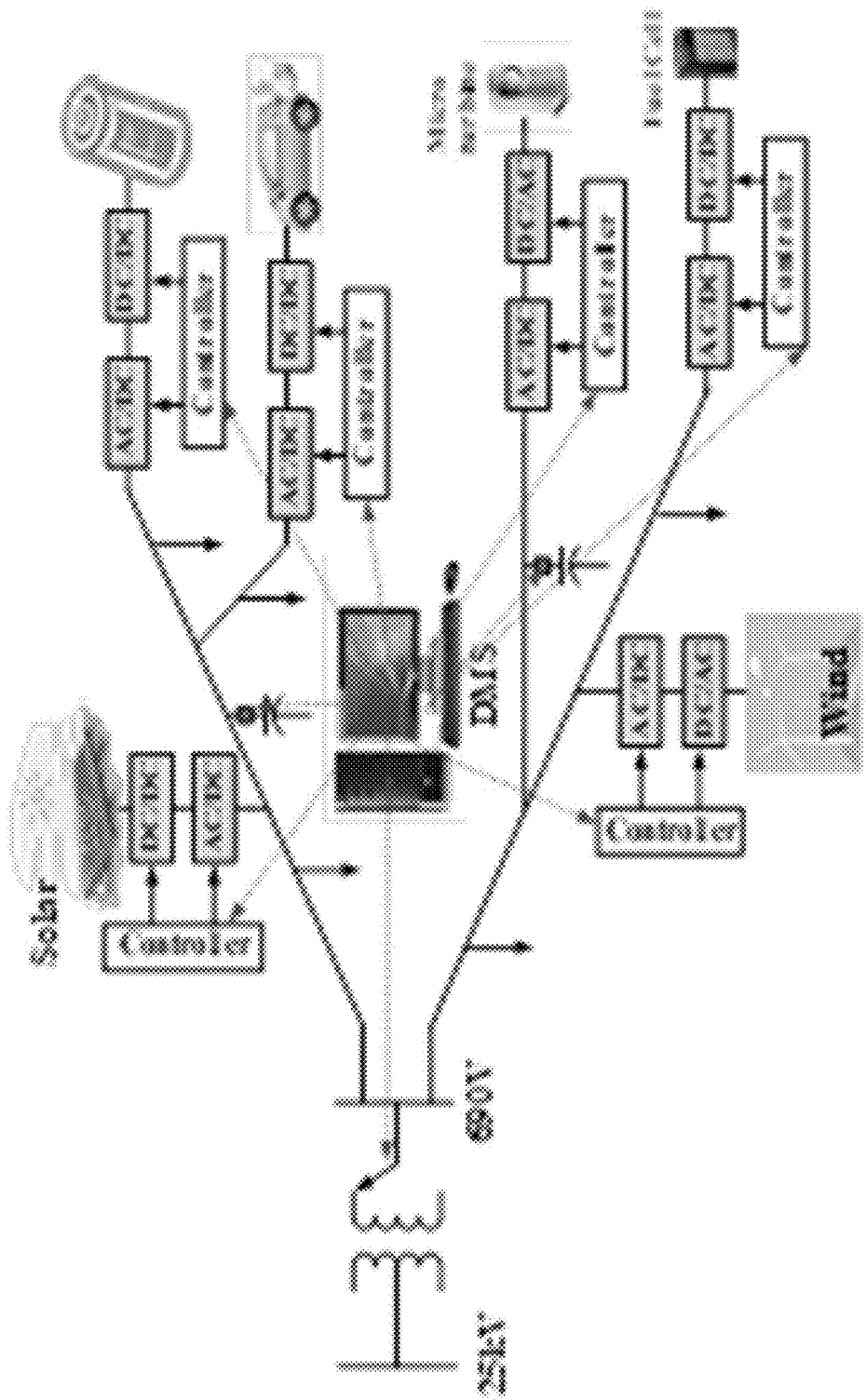
FIG. 1 is an illustration of an exemplary distribution system with DERs and other VVC power apparatus.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes—from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present methods and systems may be understood more readily by reference to the following detailed description of preferred embodiments and the Examples included therein and to the Figures and their previous and following description.

FIG. 1 shows a distribution system with distributed DERs and other VVC power apparatus. Typical DERs include solar photovoltaic (PV) arrays, wind turbines, fuel cells, batteries, microturbines, and the like. Typical converter configurations for those DER units include: 1) ac/dc and dc/dc converters for PV arrays, batteries and fuel cells, 2) ac/dc and dc/ac converters for wind and micro turbines, and 3) dc-link capacitor between grid-side inverter and DER-side converter. Thus, each DER unit can operate fully or partially as a STATCOM to provide volt/VAR support depending on how much active power is transferred between a DER and the grid.

The volt/VAR capability of DERs can complement and leverage feeder side volt/VAR control in the following ways. The first, a low-cost approach, is the autonomous volt/VAR regulation to accomplish electric utility specified objectives, such as maintaining unity power factor or nominal bus voltage at hundreds DER points. Specially, the IEEE 1547 standard on voltage regulation states that the DER shall not cause the Area EPS service voltage at other Local EPSs to go outside the requirements of ANSI C84.1-1995, Range A which is ±5% of the nominal voltage. The second, a much more expensive and complicated method, is to participate distribution system VVO, in which the desired reactive power production or bus voltage of a DER is determined according to optimal overall cost or profit to operate DERs and other VVC power devices (FIG. 1). The DMS sends out reactive power or bus voltage references to DER inverters, while each DER inverter ensures that the reference command from the DMS is reached.

Figure 2A:
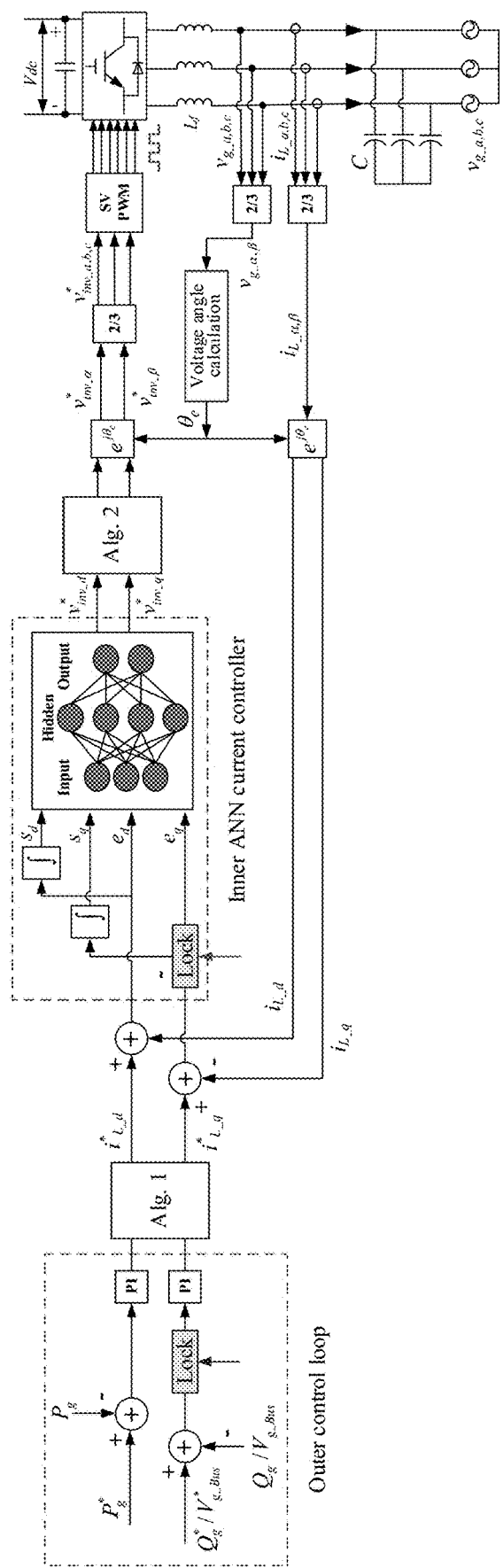
FIG. 2A is an illustration of an ANN Control system configured to control an inverter.
Figure 2B:
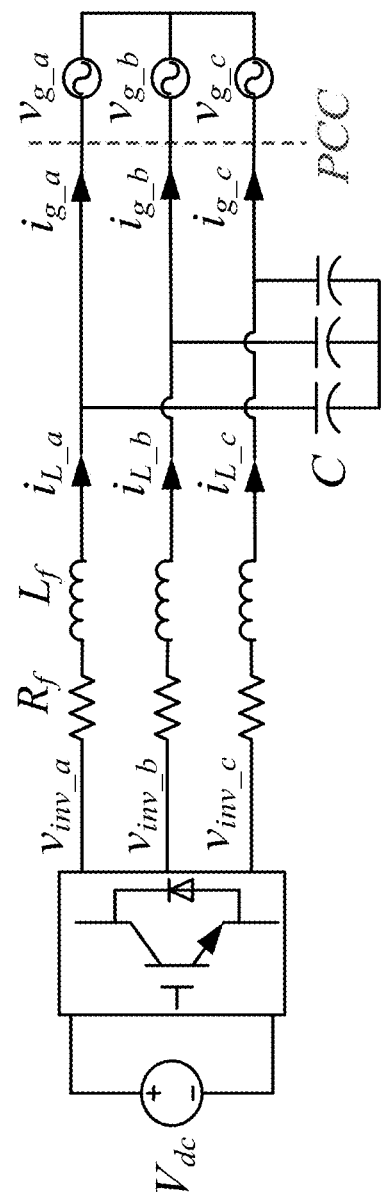
FIG. 2B is a schematic of a DER inverter with an LC filter.

Described herein are embodiments of a system and method for controlling an inverter with an LC-filter based DER using an ANN controller. One embodiment of the control system is illustrated in FIG. 2A. This embodiment of the control system comprises a controller comprised of an outer control loop, an inner controller comprising an ANN, and an inverter. An LC filter may be used in conjunction with the DER and the inverter, as illustrated in FIG. 2B FIG. 2B shows the schematic of a DER inverter connected to the grid through an LC filter, in which the dc voltage $V_{dc}$ on the left represents the power supply of a DER source (such as a solar photovoltaic array, wind turbine, fuel cells, batteries, microturbines and the like) where $V_{dc}$ represents the dc voltage across the dc-link capacitor that can be connected to the DER source (e.g., a PV array via dc/dc converters or a wind generator via a dc/ac converter), and a three-phase voltage source $v_{g\_a,b,c}$ represents the three-phase ac voltage at the Point of Common Coupling (PCC). In FIG. 2B, $L_f$ and $R_f$ are the inductance and resistance of the LC filter, C is the LC filter capacitance, $v_{inv\_a,b,c}$ stands for the three-phase inverter output voltage in the ac system, and $i_{g\_a,b,c}$ signifies the three-phase current flowing into the grid at the PCC.

Figure 3:
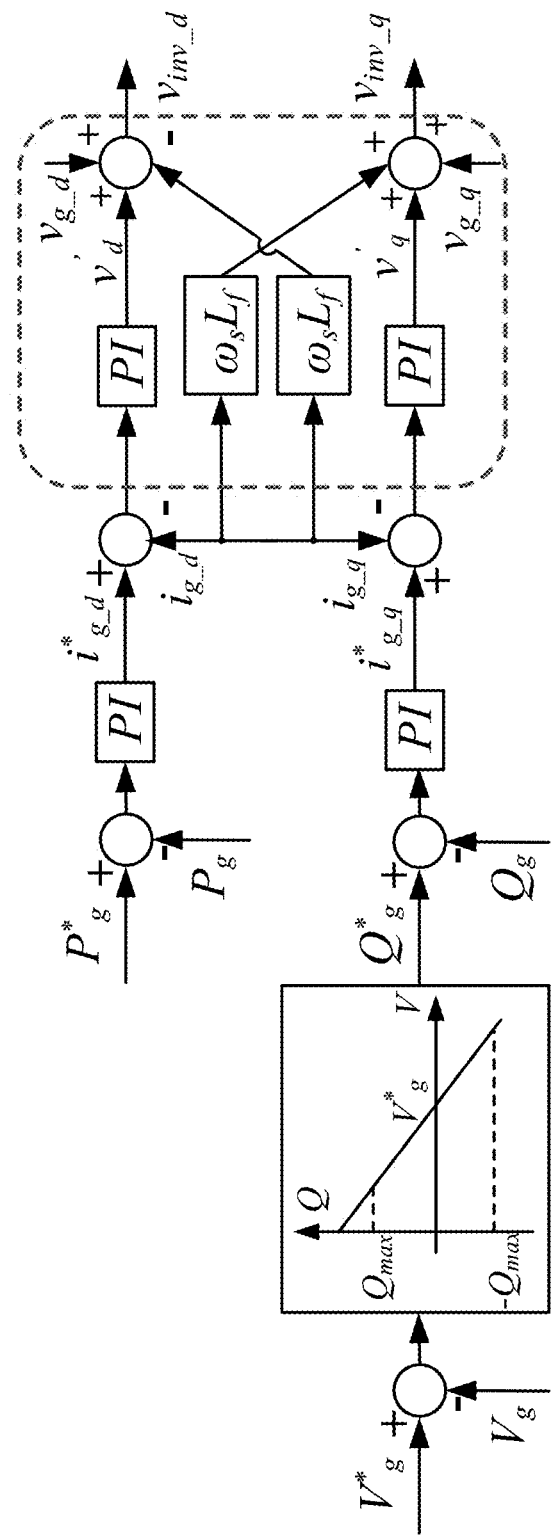
FIG. 3 is a conventional standard vector control schematic with droop-based volt control.
Figure 4:
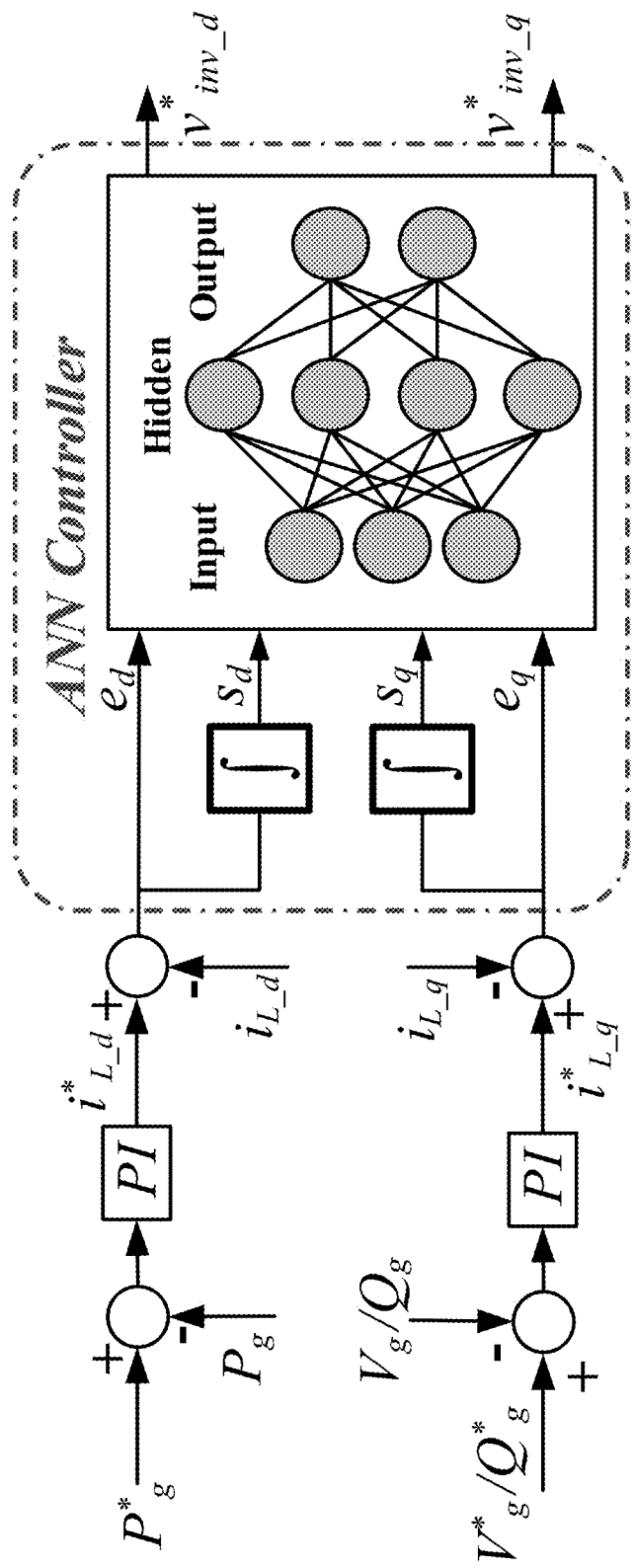
FIG. 4 is a schematic of ANN control configuration for a DER inverter.

Referring back to FIG. 2A, this embodiment of a control system is modeled in the dq reference frame. $I_{L\_d}$ represents the d-axis reference current, while $I_{L\_q}$ represents the q-axis reference current. The ANN comprises four layers: an input layer, two hidden layers, and an output layer. Generally, the input layer comprises four inputs. Two of these inputs comprise the vector $\vec{e}_{dq}(k)$ (the error term). The other two inputs comprise $\vec{s}_{dq}(k)$, the integral of the error term. A standard vector control diagram is illustrated in FIG. 3, while an ANN vector control diagram is illustrated in FIG. 4. The error term and the integral of the error term are defined by the following equation:

$$\vec{e}_{dq}(k)=\vec{i}_{L\_dq}(k)-\vec{i}*_{L\_dq}(k), \vec{s}_{dq}(k)=\int_0^k \vec{e}_{dq}(k)dt$$

As shown in FIG. 4, ANN-based control implements VVC directly based on reference reactive power or bus voltage command, which can be either a nominal value or a value provided by the DMS for a larger system. The inner-loop current controller is an ANN controller. However, an LC filter is used in order to improve VVC effectiveness. Thus, an issue is how the capacitor impact should be considered to build an ANN controller. Based on the analysis presented herein, the grid power (including the capacitor impact) can be controlled via the inductor current. Thus, the ANN is designed to control the inductor current as shown in FIG. 4, in which the outer power-loop controller generates a reference inductor current while the inner-loop ANN controller regulates the actual d-/q-axis inductor current to follow the reference current.

The output layer of the ANN translates the output of the network into $\vec{v}*_{inv\_dq}(k)$. As the ratio of the inverter output voltage $\vec{v}_{inv\_dq}$ to the ANN output $\vec{v}*_{inv\_dq}$ is the gain of the pulse-width-modulation (PWM), denoted as $k_{PWM}$, the final control action $\vec{v}_{inv\_dq}$ outputted by the inverter in the AC system is:

$$\vec{v}_{inv\_dq}(k)=k_{PWM}\cdot A(\vec{e}_{dq}(k),\vec{s}_{dq}(k),\vec{w})$$

where $A(\vec{e}_{dq}(k),\vec{s}_{dq}(k),\vec{w})$ represents the mathematical model of the ANN, and $\vec{w}$ is the network weight vector. Note: the feed-forward network shown in FIG. 4 has feedback connections through the output of the ANN, the inverter, the grid filter and the current feedback connections back to its input. Thus, the ANN controller actually is a recurrent neural network (RNN).

In one aspect, the neural network vector control system can be trained by implementing an approximate dynamic programming (ADP) based training algorithm. The objective of the training may be to achieve optimal control based on an ADP cost-to-go function. The ADP training algorithm may comprise the following cost-to-go function:

$$C\left(\vec{i}_{L\_dq}\right)=\sum_{k=1}^{N}([i_{L\_d}(k)-i*_{L\_d}]^2+[i_{L\_q}(k)-i*_{L\_q}]^2)$$

In some instances, the ANN may be trained to minimize the cost-to-go function. The gradient of the cost-to-go function may be calculated by the chain rule. The minimization of the cost-to-go function may be performed by repeatedly adjusting the network weights. This adjustment is performed by generating a quantity $\Delta\vec{w}$ to adjust the network weights by, and then adding that adjustment term to the network weights to adjust the network weights:

$$\vec{w}_{update}=\vec{w}+\Delta\vec{w}$$

This process may continue until a stop criterion is reached. For example, the network weights can be adjusted repeatedly until a well-trained ANN is obtained. An advantage for training an ANN is that small noises can be added during the training process which helps to improve ANN robustness and adaptive ability at the real-time control stage. After successful training, the ANN can implement optimal d-q current control based on ADP (i.e. the system can make the actual d-q current track a d-q reference current trajectory as closely as possible).

The outer-loop controller or controllers include active and reactive power controllers. These controllers may be tuned using a simulation model built by using MATLAB. The tuning process may continue until the outer-loop controller performance is satisfactory.

Because the ANN can implement ADP, the ANN controller may be an approximate optimal controller. Further, the ANN may be a recurrent network, enabling it to exhibit strong predictive control ability. The ANN may also emulate proportional integral and proportional resonant control characteristics. Therefore, the ANN combined with ADP may integrate optimal, predictive, proportional-integral, and proportional-resonant control characteristics together, separately, or in various combinations.

A first algorithm, (Algorithm 1, shown below), is used to generate the input to the inner controller. The first algorithm calculates the amplitude of the reference current generated by the outer-loop controller. If the amplitude is larger than the rated current of the inverter, the q-axis current reference is adjusted to satisfy the reactive power or PCC bus voltage control as close as possible to the demanded or reference value while keeping the d-axis current reference unchanged to maintain active power control effectiveness. At the same time, the outer-loop VVC controller is blocked until there is a potential for the reference current amplitude to drop.

---

Algorithm 1: Preventing DER inverter operating beyond rated current limit

---

1: Inputs from outer-loop controllers: $i^*_{g\_d}, i^*_{g\_q}$
2: if $\sqrt{(i^*_{L\_d})^2 + (i^*_{L\_q})^2} \leq I_{inv\_rated}$
3:     Goto 15
4: else
5:     $i^*_{L\_q} \leftarrow \text{sign}(i^*_{L\_q}) \cdot \sqrt{(I_{inv\_rated})^2 - (i^*_{L\_d})^2}$
6:     Flag_I ← 0;
7: end if
8: if Flag_I=0
9:     Block VVC controller;
10:     if there is a potential for $|i^*_{L\_dq}| \leq I_{inv\_rated}$
11:         Release blocking VVC controller;
12:         Flag_I ← 1;
13:     end if
14: end if
15: Output $i^*_{g\_d}, i^*_{g\_q}$ to inner current controller

---

A second algorithm (Algorithm 2, shown below) prevents the inverter from being operated beyond the PWM saturation. Algorithm 2 checks whether the PWM over modulation appears continuously for a period of N samples. If the check is positive (Flag_V=0), the algorithm blocks the error signal passed to the ANN controller and blocks the VVC controller as well. This basically represents a strategy of maintaining the active power control effectiveness while meeting the reactive power control requirement as much as possible. To release the block, either the control action generated by the ANN controller is lower than the PWM saturation limit or the VVC controller has a potential to draw the ANN controller out of the PWM saturation limit.

---

Algorithm 2: Preventing DER inverter from operating beyond PWM saturation limit

---

1: if PWM saturation appears continuously for N samples
2:     Flag_V ← 0
3: else
4:     Goto 15
5: end if
6: if Flag_V=0
7:     Block the q-axis error signal being passed to the ANN controller;
8:     Block VVC controller;
9:     if there is a potential for the ANN controller to go out of the PWM saturation limit
10:         Release blocking the ANN controller;
11:         Release blocking the VVC controller;
12:         Flag_V ← 1;
13:     end if
14: end if
15: Output ANN control action to SVPWM

---

Algorithm 2 cannot be applied to a conventional controller because it will affect the q-axis voltage generated by the controller and therefore affect the active power control instead of the reactive power control.

In FIG. 2A, instead of using instantaneous voltage or reactive power feedback signal in the outer control loop, the ANN control system uses voltage or reactive power feedback signal that is averaged over a short time period to improve the autonomous volt and VAR control ability.

Figure 5:
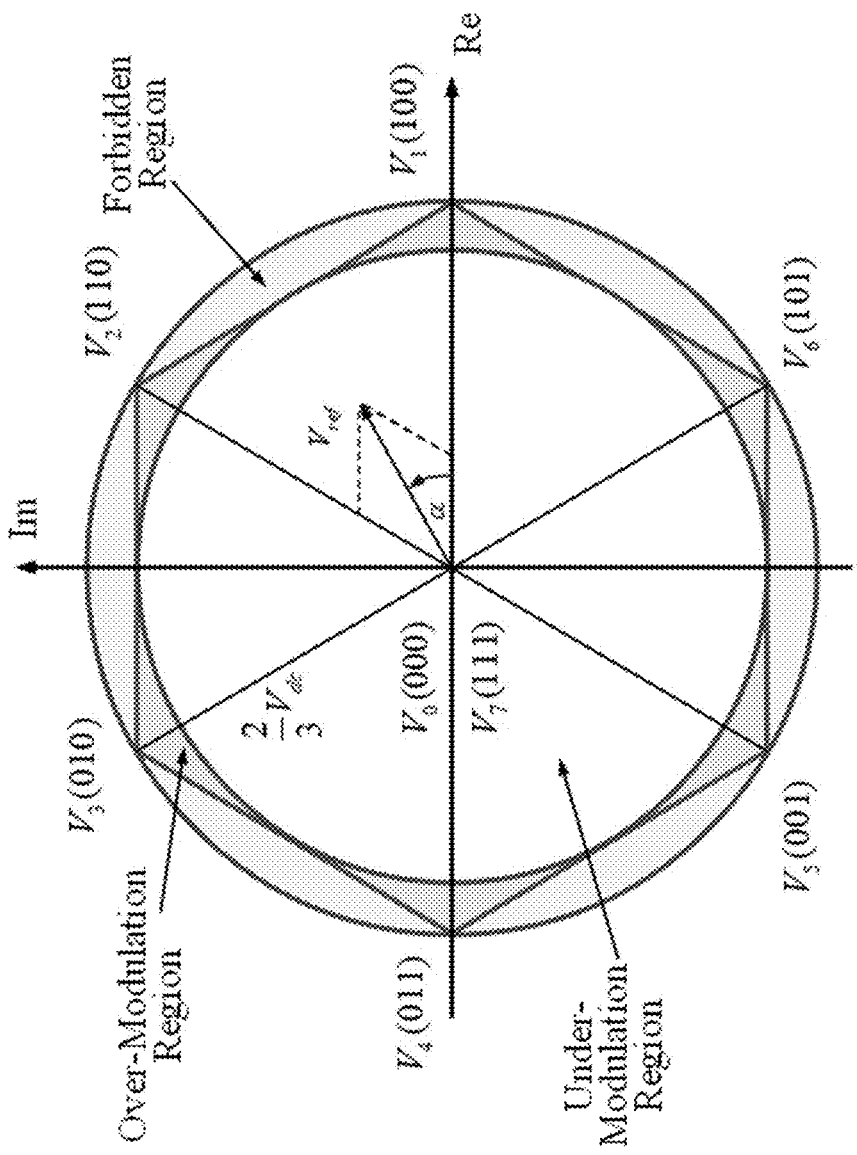
FIG. 5 illustrates the linear and over-modulation regions in space vector representation.

The VVC effectiveness and efficiency may be enhanced through the use of space vector pulse-width modulation (SVPWM). The DER inverter may be operated in the linear modulation region or in the over-modulation region. During transient operation, the DER inverter may enter into the over-modulation region. FIG. 5 illustrates a space vector representation of the linear and over-modulation regions.

It is to be appreciated that this is just an example of one embodiment, and that the scope of this disclosure is intended to cover other aspects, including, for example, different types of materials, different numbers of layers and/or arrangement of the layers, different material thicknesses and/or dimensions, and the like.

EXAMPLES

Figure 6:
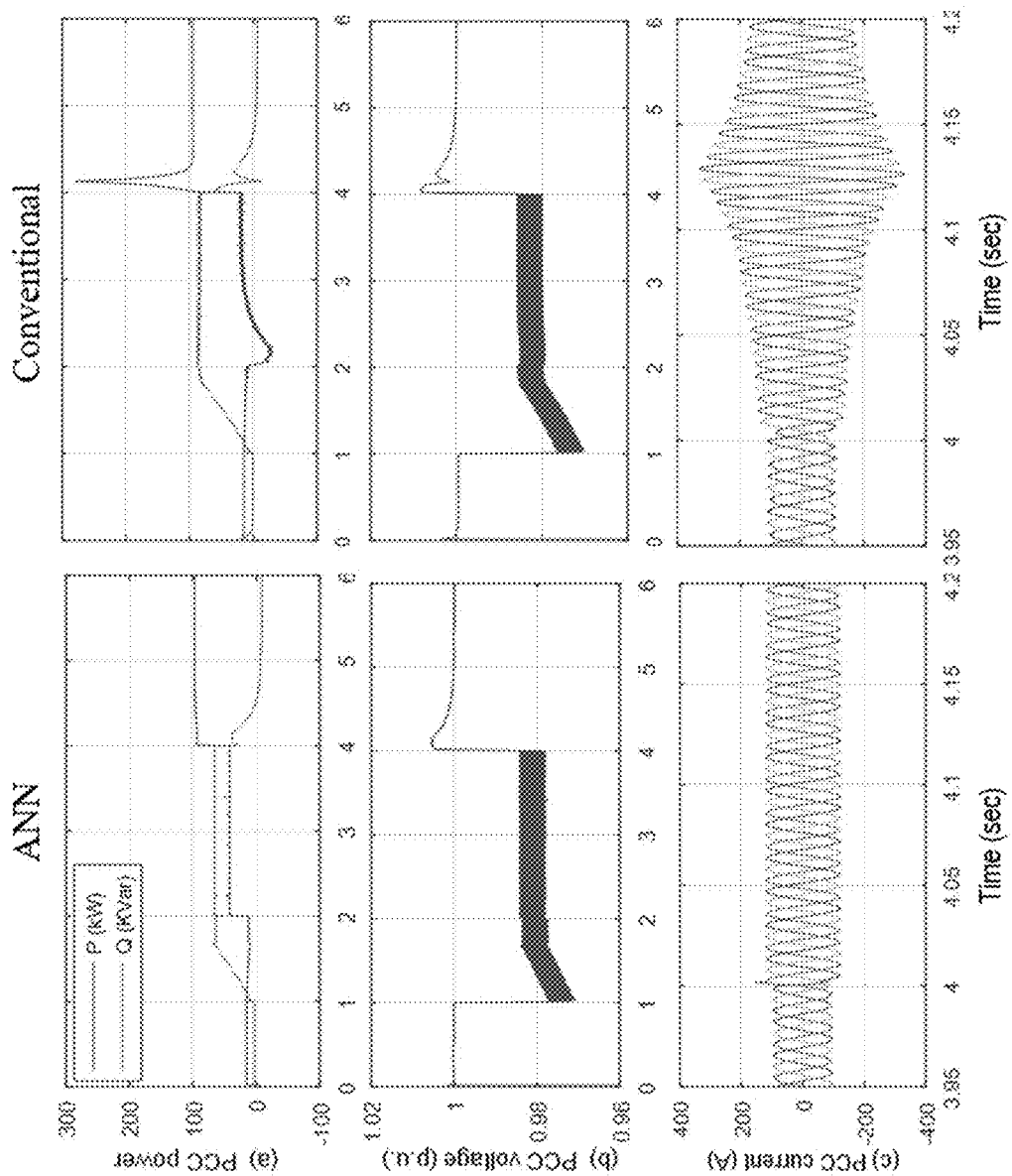
FIG. 6 illustrates the simulated performance of the system with one inverter.

To verify the feasibility and stability of the VVC using an ANN control system, several simulations were performed. For the case of a single inverter, an inverter was modelled with a switching frequency of 6 kHz. The inverter was connected to a point of common coupling (PCC) bus. A fault-load was connected to the PCC bus and modeled to evaluate how the controller behaved when a fault appeared in the grid. The ANN control system quickly regulates the active power and voltage of the PCC bus to the reference values. When the fault is cleared, the ANN control system returns to its normal operating condition quickly, and the PCC bus voltage returns to the rated bus voltage, as seen in FIG. 6. In contrast, a large overshoot of real and active power will appear when a conventional controller is used, as shown in FIG. 6.

Figure 7:
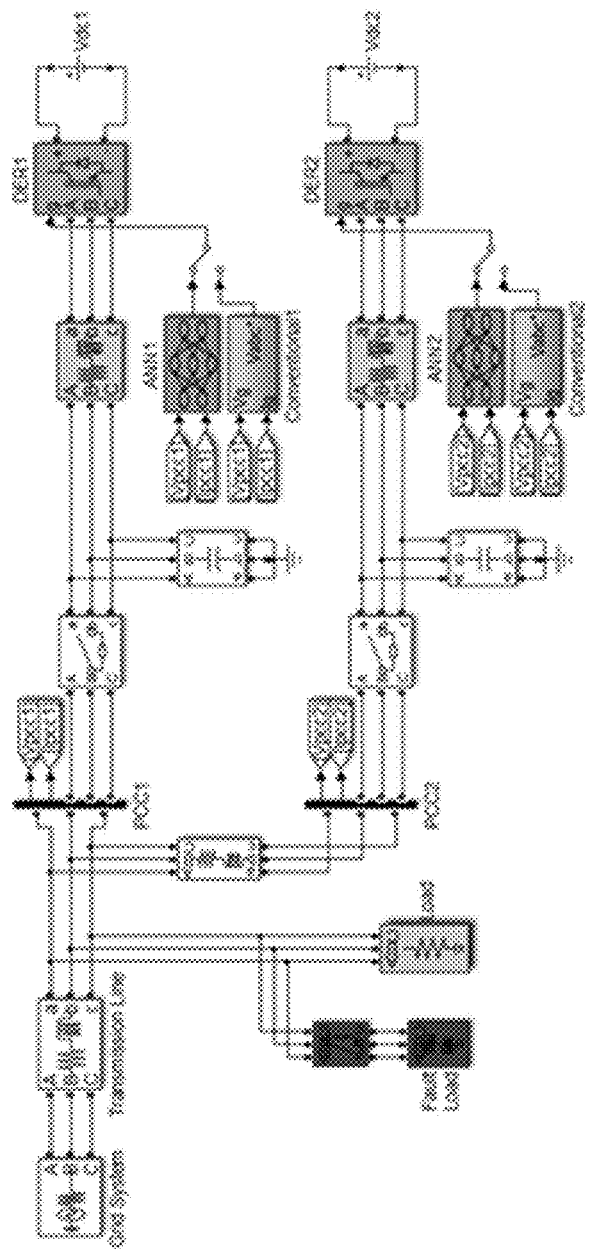
FIG. 7 is a schematic of two parallel inverters connected to the same feeder.
Figure 8:
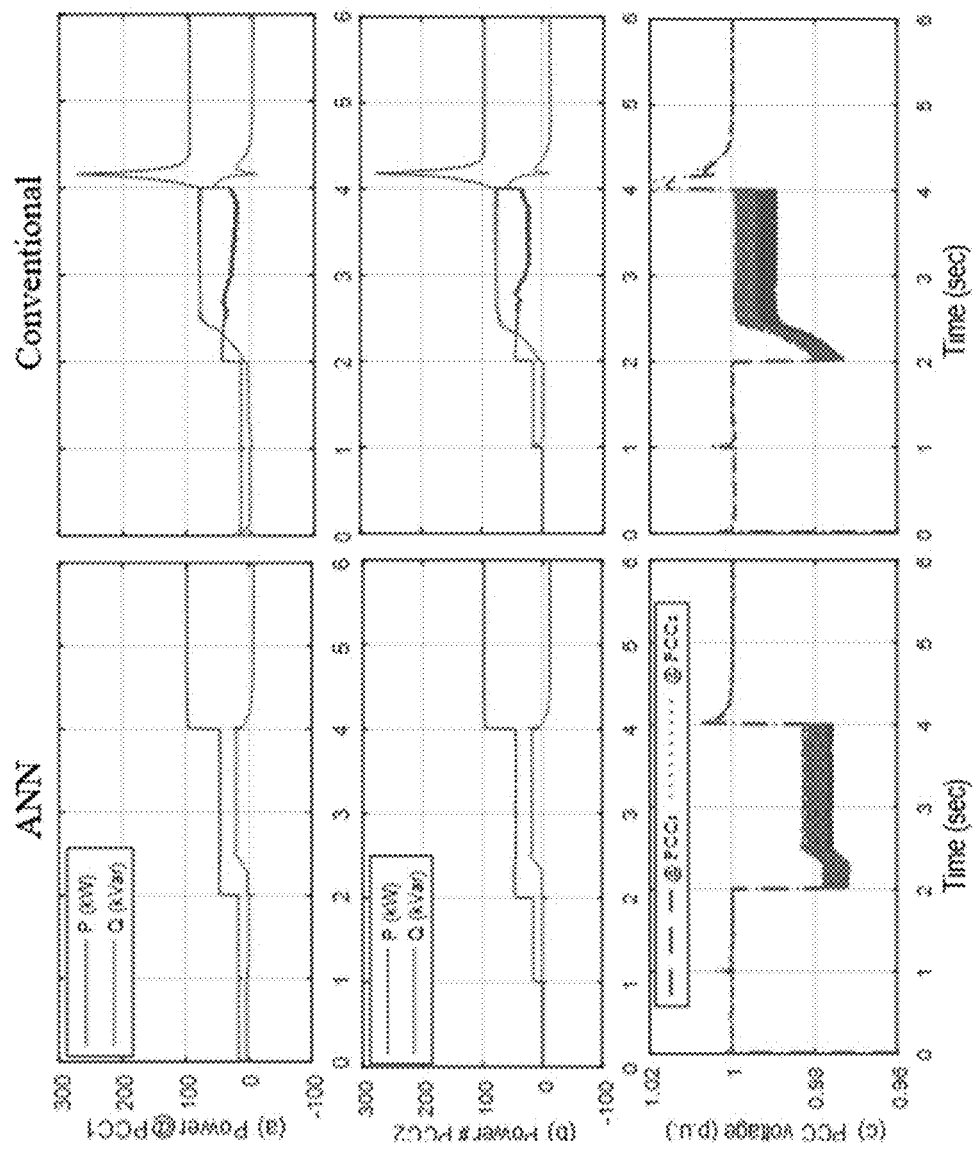
FIG. 8 illustrates the simulated performance of the system with two parallel inverters.

The case of two parallel inverters on the same feeder was also modeled, with each inverter having its own PCC bus as illustrated in FIG. 7. A fault was modeled, and the ANN control system allowed both inverters to regulate the reactive power properly for PCC bus voltage control without fighting of the reactive power control between the two inverters. The modeled DER inverters effectively share their reactive power to support each of their PCC bus voltages until each inverter reaches its maximum capacity in terms of rated current or PWM saturation limit. In contrast, a conventional controller cannot properly control active power during the fault. This leads to a large oscillation in the PCC power and currents after the fault, which may cause inverters to be tripped. These characteristics are shown in FIG. 8.

Figure 9:
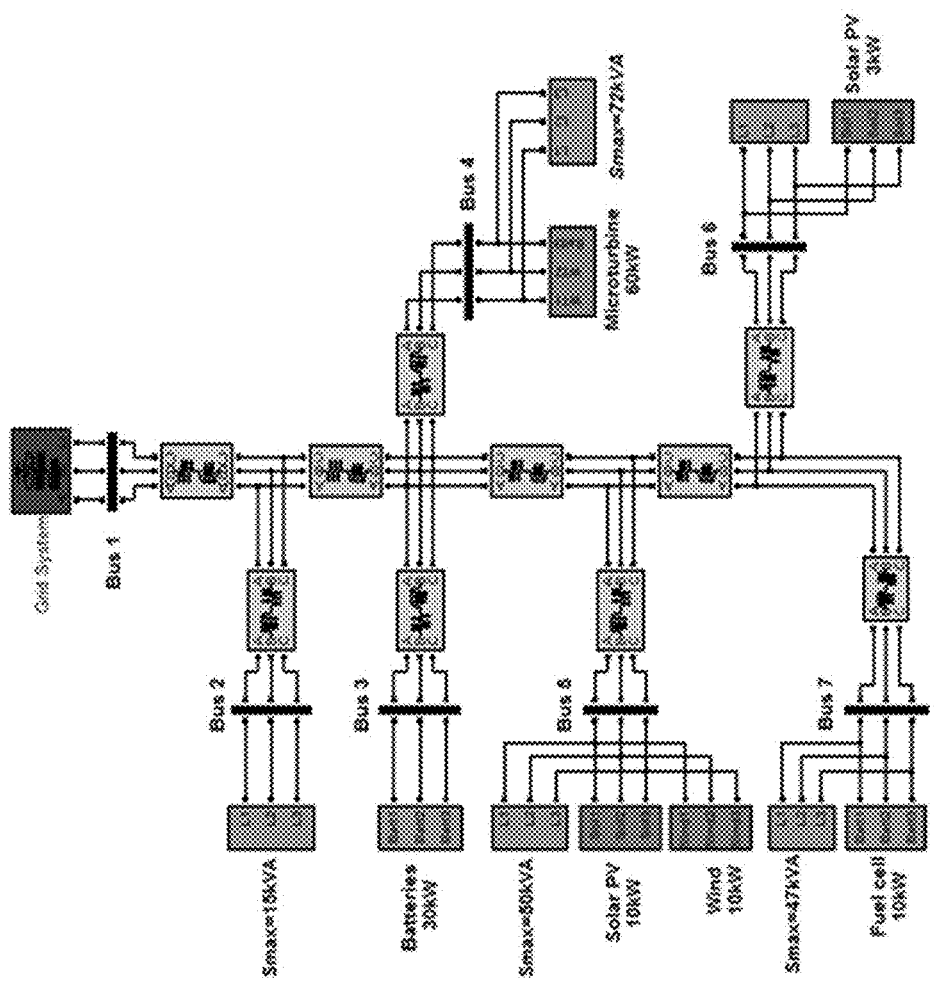
FIG. 9 shows a simulated configuration of DERs and buses.
Figure 10:
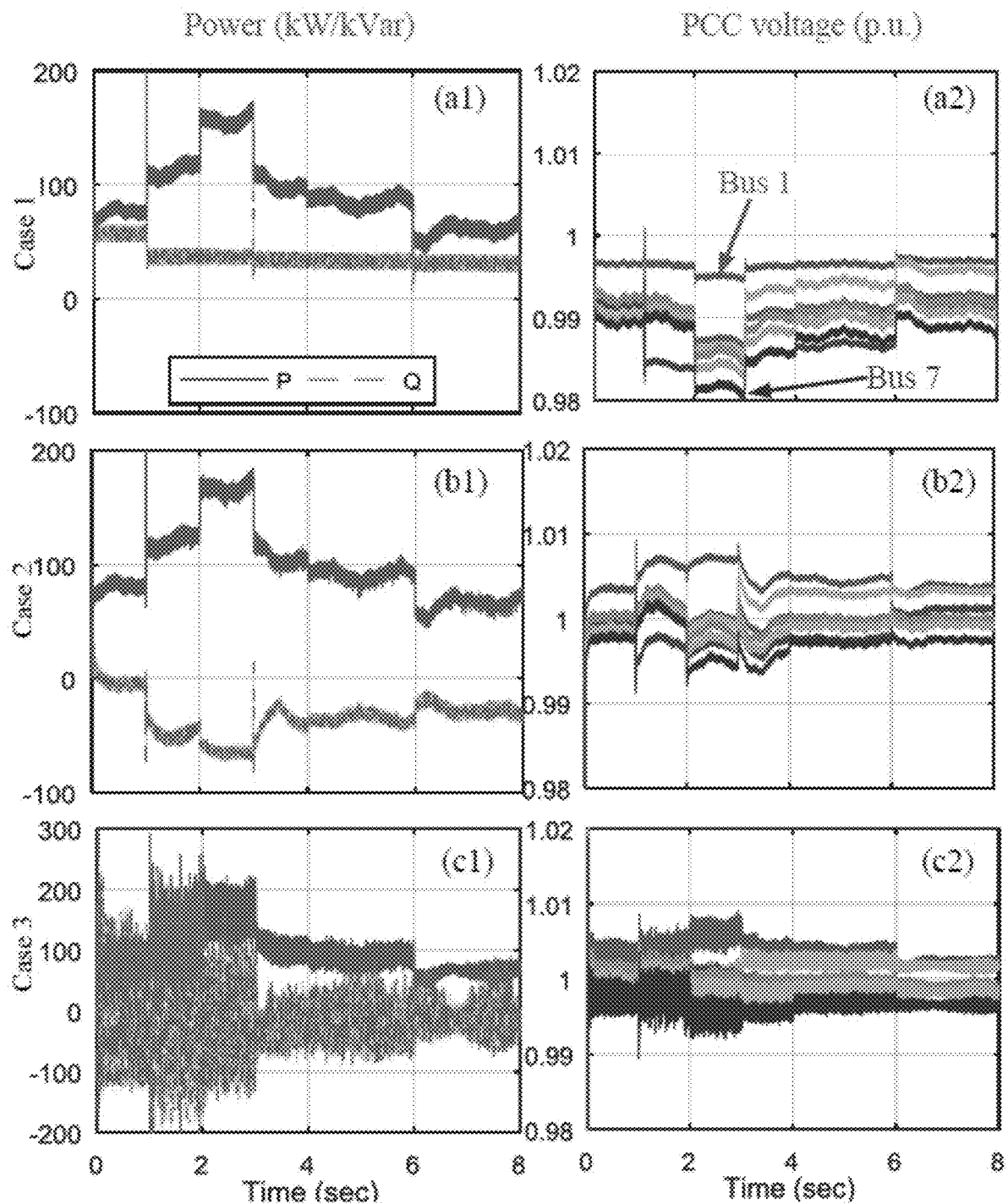
FIG. 10 illustrates the ability of the ANN control system to provide VVC on each bus.

Finally, VVC at the grid edge along a low-voltage test feeder was modeled. FIG. 9 illustrates a modeled arrangement of DERs and buses and FIG. 10 shows the ability of the ANN control system to provide autonomous VVC on each bus (Case 2) compared with unity power factor control on each bus (Case 1) and droop-based VVC on each bus (Case 3).

Figure 11:
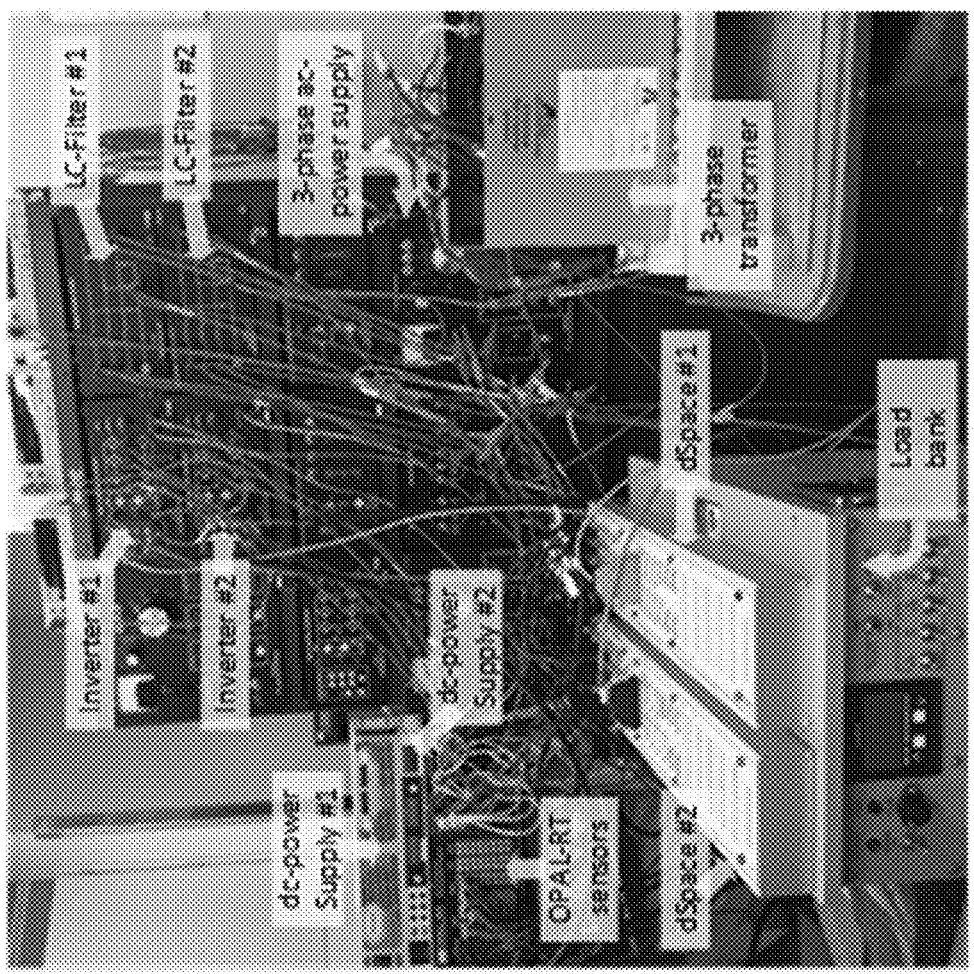
FIG. 11 is a photograph that shows the hardware testing and control systems during an experiment of aspects of the present invention.
Figure 12:
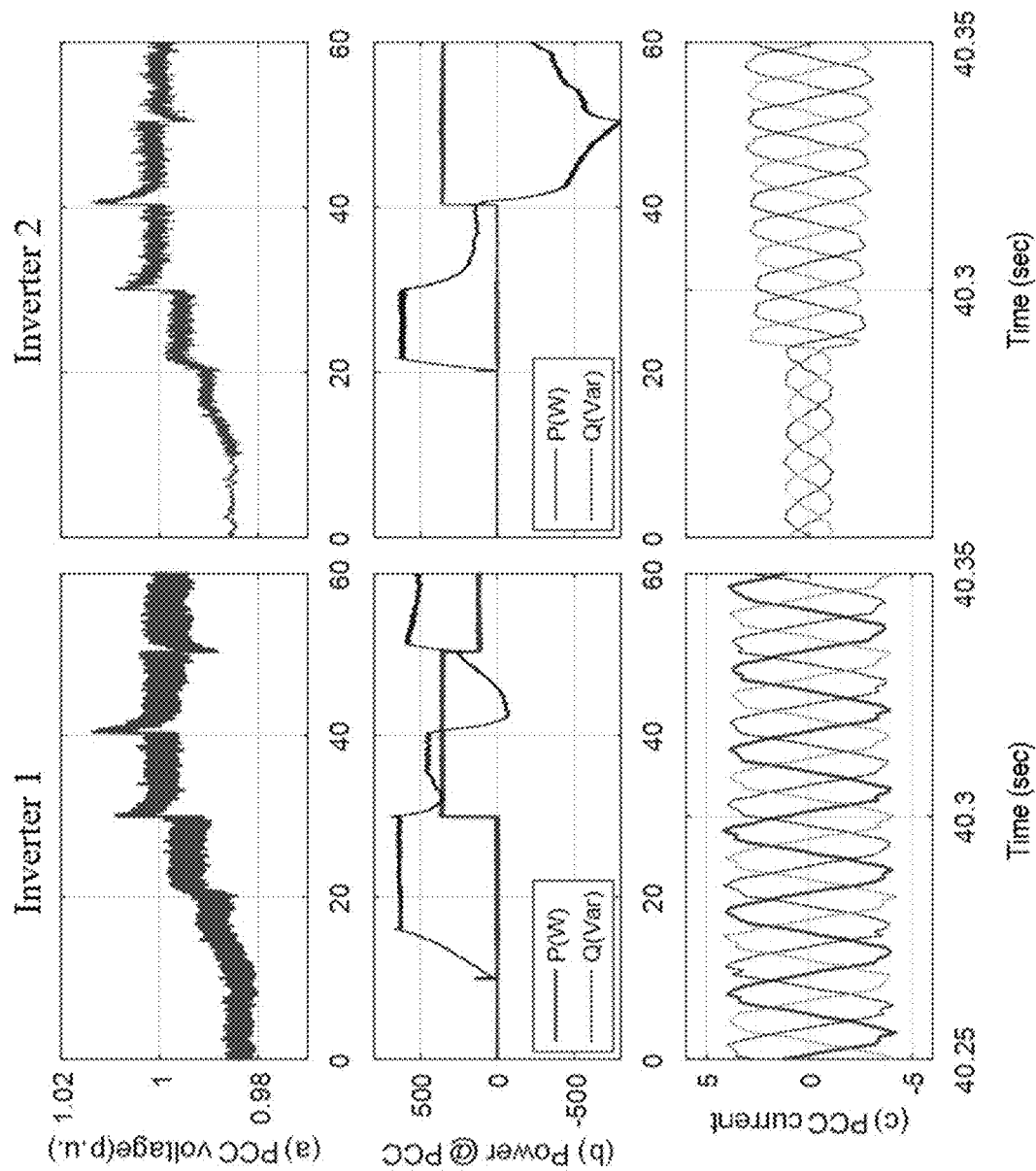
FIG. 12 illustrates the experimental results for two parallel inverters in active power and PCC voltage control mode using an ANN controller.

To further verify the feasibility and stability of VVC using an ANN control system, a hardware experiment was performed. FIG. 11 shows a configuration of the experimental hardware. Two inverters were placed in parallel. The voltage gains of the two controllers were slightly different and the ANN control systems between the two inverters are not synchronized. FIG. 12 details the results of the experiment.

As shown in row "b" of FIG. 12, the inverters did not fight, and the second inverter was immediately synchronized with the grid. This demonstrates the advantages of an ANN control system over a conventional control system.

CONCLUSION

Disclosed and described herein are embodiments of an ANN control system that implements optimal control based on approximate dynamic programming. Also disclosed and described are special techniques that allow the ANN controller to be able to handle VVC effectively when considering the physical constraints of DER inverters. The exemplary ANN control system is capable of performing VVC at the grid edge and preventing fighting among parallel inverters. Therefore, the developed ANN control system is applicable for DER applications where the ANN control system could enhance the grid reliability, stability, and power quality. Further, the ANN control system maintains stable voltage at the grid edge. For potential operation beyond the inverter physical constraints, the ANN control system operates the inverters by maintaining active power control while meeting the VVC demand as much as possible, even in situations where a conventionally controlled inverter would struggle. These and other benefits of an ANN control system facilitate the integration of DERs into the grid.

Figure 13:
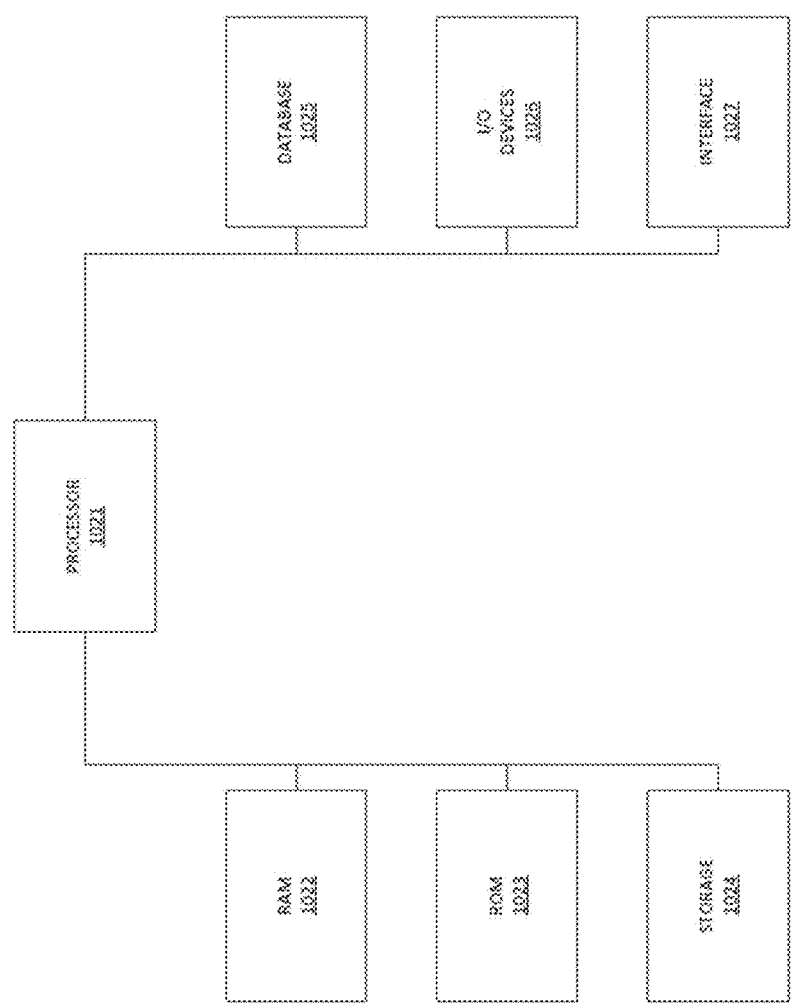
FIG. 13 illustrates an exemplary computer that can be used for controlling an inverter.

FIG. 13 illustrates an exemplary computer that can be used for controlling a DC/DC converter or a standalone DC microgrid. As used herein, "computer" may include a plurality of computers. The computers may include one or more hardware components such as, for example, a processor 1021, a random-access memory (RAM) module 1022, a read-only memory (ROM) module 1023, a storage 1024, a database 1025, one or more input/output (I/O) devices 1026, and an interface 1027. Alternatively, and/or additionally, the computer may include one or more software components such as, for example, a computer-readable medium including computer executable instructions for performing a method associated with the exemplary embodiments. It is contemplated that one or more of the hardware components listed above may be implemented using software. For example, storage 1024 may include a software partition associated with one or more other hardware components. It is understood that the components listed above are exemplary only and not intended to be limiting.

Processor 1021 may include one or more processors, each configured to execute instructions and process data to perform one or more functions associated with a computer for controlling a DC/DC converter or standalone DC microgrid. Processor 1021 may be communicatively coupled to RAM 1022, ROM 1023, storage 1024, database 1025, I/O devices 1026, and interface 1027. Processor 1021 may be configured to execute sequences of computer program instructions to perform various processes. The computer program instructions may be loaded into RAM 1022 for execution by processor 1021.

RAM 1022 and ROM 1023 may each include one or more devices for storing information associated with operation of processor 1021. For example, ROM 1023 may include a memory device configured to access and store information associated with the computer, including information for identifying, initializing, and monitoring the operation of one or more components and subsystems. RAM 1022 may include a memory device for storing data associated with one or more operations of processor 1021. For example, ROM 1023 may load instructions into RAM 1022 for execution by processor 1021.

Storage 1024 may include any type of mass storage device configured to store information that processor 1021 may need to perform processes consistent with the disclosed embodiments. For example, storage 1024 may include one or more magnetic and/or optical disk devices, such as hard drives, CD-ROMs, DVD-ROMs, or any other type of mass media device. Database 1025 may include one or more software and/or hardware components that cooperate to store, organize, sort, filter, and/or arrange data used by the computer and/or processor 1021. For example, database 1025 may store data related to the control of a DC/DC converter or standalone DC microgrid. The database may also contain data and instructions associated with computer-executable instructions for controlling a DC/DC converter or standalone DC microgrid. It is contemplated that database 1025 may store additional and/or different information than that listed above.

I/O devices 1026 may include one or more components configured to communicate information with a user associated with computer. For example, I/O devices may include a console with an integrated keyboard and mouse to allow a user to maintain a database of digital images, results of the analysis of the digital images, metrics, and the like. I/O devices 1026 may also include a display including a graphical user interface (GUI) for outputting information on a monitor. I/O devices 1026 may also include peripheral devices such as, for example, a printer, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 1027 may include one or more components configured to transmit and receive data via a communication network, such as the Internet, a local area network, a workstation peer-to-peer network, a direct link network, a wireless network, or any other suitable communication platform. For example, interface 1027 may include one or more modulators, demodulators, multiplexers, demultiplexers, network communication devices, wireless devices, antennas, modems, and any other type of device configured to enable data communication via a communication network.

The figures illustrate the architecture, functionality, and operation of possible implementations of systems, methods and computer program products according to various implementations of the present invention. In this regard, each block of a flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

Any combination of one or more computer readable medium(s) may be used to implement the systems and methods described hereinabove. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to implementations of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the invention, may be made without departing from the spirit and scope thereof.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain. These publications include the following, which are each individually incorporated by reference in their entireties:

[1] Smart Grid Investment Grant Program, "Application of Automated Controls for Voltage and Reactive Power Management—Initial Results," U.S. Department of Energy, December 2012.

[2] National Electrical Manufacturers Association, "Volt/VAR Optimization Improves Grid Efficiency," [Online]. Available: https://www.nema.org/Policy/Energy/Smart-grid/Documents/VoltVAR-Optimazation-Improves%20Grid-Efficiency.pdf

[3] D. Dohnal, "On-Load Tap-Changers for Power Transformers," [Online]. Available: http://www.reinhausen-.com/XparoDownload.ashx?raid=58092.

[4] R. W. Uluski, "Volt/var control and optimization concepts and issues," Electric Power Research Institute (EPRI), 2011.

[5] C. Dai and Y. Baghzouz, "Impact of distributed generation on voltage regulation by LTC transformer," in *Proc. 11th ICHQP*, Lake Placid, N.Y., USA, 2004.

[6] P. P. Barker and R. W. De Mello, "Determining the impact of distributed generation on power systems. I. Radial distribution systems," in *Proc. IEEE PES Summer Meeting*, Seattle, Wash., 2000, pp. 1645-1656.

[7] R. W. Uluski, "VVC in the Smart Grid era," in *Proc. IEEE PESGM*, Minneapolis, Minn., Jul. 26-29, 2010.

[8] M. Manbachi, M. Nasri, B. Shahabi, H. Farhangi, A. Palizban, S. Arzanpour, M. Moallem, and D. C. Lee. "Real-Time Adaptive VVO/CVR Topology Using Multi-Agent System and IEC 61850-Based Communication Protocol," *IEEE Trans. Sustainable Energy*, vol. 5, no. 2, pp. 587-597, April 2014.

[9] J. E. Mendoza, D. A. Morales, R. A. Lopez, E. A. López, J. C. Vannier, and C. A. C. Coello, "Multiobjective location of automatic voltage regulators in a radial distribution network using a micro genetic algorithm," *IEEE Trans. Power Syst.*, vol. 22, no. 1, pp. 404-412, February 2007.

[10] Y. Liu, P. Zhang, and X. Qiu, "Optimal volt/var control in distribution systems," *Int. J. Electrical Power and Energy Syst.*, vol. 24, no, 4, pp. 271-276, 2002,

[11] S. Naka, T. Genji, T. Yura, and Y. Fukuyama, "A hybrid particle swarm optimization for distribution state estimation," *IEEE Trans. Power Syst.*, vol. 18, no. 1, pp. 60-68, 2003.

[12] M. Biserica, Y. Besanger, R. Caire, O. Chilard, and P. Deschamps, "Neural networks to improve distribution state estimation—Volt var control performances," *IEEE Trans. Smart Grid.*, vol. 3, no. 3, pp. 1137-1144, September 2012.

[13] R. Moghe, D Tholomier, D Divan, J Schatz, and D. Lewis. "Grid Edge Control: A new approach for volt-var optimization." in *Proc. IEEE PES T&D.*, pp. 1-5., 2016.

[14] P. Jahangiri and D. C. Aliprantis. "Distributed Volt/VAr control by PV inverters," *IEEE Trans. Power Syst.*, vol. 28, no. 3, pp. 3429-3439, August 2013.

[15] E. Ghiani and P. I. L. O. Fabrizio, "Smart inverter operation in distribution networks with high penetration of photovoltaic systems," *J. of Modern Power Syst. and Clean Energy*, vol. 3, no. 4, pp. 504-511, 2015

[16] F. Bell, A. Nguyen, M. McCarty, K. Atef, and T. Bialek, "Secondary voltage and reactive power support via smart inverters on a high-penetration distributed photovoltaic circuit," in *Proc. IEEE Innovative Smart Grid Technologies Conf.*, pp. 1-6, 2016.

[17] D. Divan, R. Moghe, and A. Prasai. "Power Electronics at the Grid Edge: The key to unlocking value from the smart grid," *IEEE Power Electron. Mag.*, vol. 1, no. 4, pp. 16-22, December 2014.

[18] H. Zhu and H. J. Liu, "Fast Local Voltage Control Under Limited Reactive Power: Optimality and Stability Analysis," *IEEE Trans. Power Syst.*, vol. 31, no. 5, pp. 3794-3803, September 2016.

[19] H. J. Liu, W. Shi, and H. Zhu, "Distributed Voltage Control in Distribution Networks: Online and Robust Implementations," *IEEE Trans. Smart Grid.*, in press, available online @ IEEE Xplore.

[20] S. Li, M. Fairbank, C. Johnson, D. C. Wunsch, E. Alonso, and J. Proano, "Artificial Neural Networks for Control of a Grid-Connected Rectifier/Inverter under Disturbance, Dynamic and Power Converter Switching Conditions", *IEEE Trans. Neural Netw. Learn. Syst.*, vol. 25 no. 4, pp. 738-750, April 2014.

[21] IEEE 1547-2018, IEEE, 3 Park Avenue, New York, N.Y. 10016-5997, USA, April 2018.

[22] J. M. Guerrero, J. C. Vasquez, J. Matas, L. G. De Vicuña, and M. Castilla, "Hierarchical control of droop-controlled AC and DC microgrids—A general approach toward standardization," *IEEE Trans. Ind. Electron.*, vol. 58, no. 1, pp. 158-172, January 2011.

[23] J. Dannehl, C. Wessels, and F. W. Fuchs, "Limitations of Voltage-Oriented PI Current Control of Grid-Connected PWM Rectifiers With LCL Filters," *IEEE Trans. Ind. Electron.*, vol. 56, no. 2, pp. 380-388, February 2009.

[24] N. Mohan, T. M. Undeland, and W. P. Robbins, Power Electronics: Converters, Applications, and Design, 3rd ed., John Wiley & Sons Inc., NJ, October 2002.

[25] M. T. Hagan, H. B. Demuth, M. H. Beale, *Neural Network Design*, PWS Publishing: Boston, Mass., USA, 2002.

[26] D. P. Bertsekas, "Dynamic Programming and Optimal Control: Approximate Dynamic Programming," 4th ed., Nashua, N.H., USA: Athena Scientific, 2012.

[27] X. Fu, S. Li, M. Fairbank, D. C. Wunsch, and E. Alonso, "Training recurrent neural networks with the Levenberg-Marquardt algorithm for optimal control of a grid-connected converter," *IEEE Trans. Neural Netw. Learn. Syst.*, vol. 26, no. 9, pp. 1900-1912, September 2015.

[28] D. V. Prokhorov, L. A. Feldkamp, and I. Y. Tyukin. "Adaptive behavior with fixed weights in RNN: an overview," *Proc. 2002 IEEE Int. Joint Conf. on Neural Networks*, pp. 2018-2023, 2002.

[29] S. Li, T. A. Haskew and L. Xu, "Control of HVDC light system using conventional and direct current vector control approaches," *IEEE Trans. Power Electron.*, vol. 25, no. 12, pp. 3106-3118, December 2010.

[30] D. Lee and G. Lee, "A novel overmodulation technique for space-vector PWM inverters," *IEEE Trans. Power Electron.*, vol. 13, no. 6, pp. 1144-1151, November 1998.

[31] Y. C. Kwon, S. Kim and S. K. Sul, "Six-Step Operation of PMSM With Instantaneous Current Control," *IEEE Trans. Ind. Appl.*, vol. 50, no. 4, pp. 2614-2625, July-August 2014.

[32] S. Papathanassiou, N. Hatziargyriou, and K. Strunz, "A Benchmark Low Voltage Microgrid Network", in *Proc. CIGRE Symp. Power Syst. with Dispersed Generation*, Athens, Greece, April 2005.

[33] A. Thomas, "dSPACE DS1103 Control Workstation Tutorial and DC Motor Speed Control," Senior Project Report, Bradley University ECE Department, May 11, 2009.

[34] S. Li, Y. Sun, M. Ramezani and Y. Xiao, "Artificial Neural Networks for Volt/VAR Control of DER Inverters at the Grid Edge," in IEEE Transactions on Smart Grid, vol. 10, no. 5, pp. 5564-5573, September 2019. doi: 10.1109/TSG.2018.2887080

What is claimed is:

1. A system for controlling an inverter comprising:
an inverter;
an artificial neural network (ANN) control system for controlling the inverter, wherein the control system comprises:
a space vector pulse-width modulation (SVPWM) converter operably connected to the inverter,
a neural network control system operably connected to the SVPWM converter, the neural network control system comprising an input layer, a plurality of hidden layers, an output layer, and a processor, said neural network control system further configured to:
receive a plurality of input signals at the input layer of the neural network control system, wherein the plurality of inputs comprises $I_{L\_d}$ and $I_{L\_q}$,
output $V_{inv\_d}$ and $V_{inv\_q}$ by the neural network control system,
convert $V_{inv\_d}$ and $V_{inv\_q}$ into a $V_{inv\_a,b,c}$ signal, and output the $V_{inv\_a,b,c}$ by the neural network control system to control the SVPWM converter, wherein the neural network control system is trained to minimize a cost function.

2. The system of claim 1, wherein the number of hidden layers is two.

3. The system of claim 1, wherein the processor is configured to implement an outer control loop.

4. The system of claim 1, wherein the processor is configured to implement a first algorithm which generates the $I_{L\_d}$ and $I_{L\_q}$ inputs to the neural network.

5. The system of claim 4, wherein the processor is configured to implement a second algorithm processing $V_{inv\_d}$ and $V_{inv\_q}$ to produce a control action.

6. The system of claim 1, wherein the cost function to be minimized is:

$$C(\vec{i}_{L\_dq}) = \sum_{k=1}^{N} ([i_{L\_d}(k) - i^*_{L\_d}]^2 + [i_{L\_q}(k) - i^*_{L\_q}]^2).$$

7. The system of claim 1, wherein the inverter is connected to a distributed energy resource (DER).

8. The system of claim 7, wherein the DER comprises one or more of a solar photovoltaic array, a wind turbine, a fuel cell, a battery or a microturbine.

9. The system of claim 1, wherein the ANN control system is configured to implement a function to automatically detect the condition whether an DER inverter has reached rated current constraint and when detected the ANN control system will operate based on a strategy to maintain the active power control of the DER unit while providing volt or VAR control as close as possible to the demanded value, and at the same time lock the volt/VAR controller.

10. The system of claim 9, wherein the ANN control system is configured to implement a function to automatically detect whether there is a potential that the DER inverter will operate below the rated current when an DER inverter is operating at the rated current condition and when detected the ANN control system will return to its normal control condition to provide demanded active and volt/VAR control, and at the same time liberate the volt/VAR controller.

11. The system of claim 1, wherein the ANN control system is configured to implement a function to automatically detect the condition whether an DER inverter has reached PWM saturation constraint and when detected the ANN control system will operate based on a strategy to maintain the active power control of the DER unit while providing volt or VAR control as close as possible to the demanded value, and at the same time lock the volt/VAR controller and ANN q-axis control loop.

12. The system of claim 11, wherein the ANN control system is configured to implement a function to automatically detect whether there is a potential that the DER inverter will operate below the PWM saturation constraint when an DER inverter is operating at the PWM saturation condition and when detected the ANN control system will return to its normal control condition to provide demanded active and volt/VAR control, and at the same time liberate the volt/VAR controller and ANN q-axis control loop.

13. The system of claim 1, wherein the ANN control system is configured to combine with space vector pulse-width modulation (SVPWM) that is suitable to operate a DER inverter not only in linear-modulation region but also in over-modulation region temporarily to meet short-term, transient volt and VAR control needs.

14. The system of claim 1, wherein the ANN control system uses an instantaneous voltage or instantaneous reactive power as its feedback signal in the outer control loop.

15. The system of claim 1, wherein the ANN control system uses a voltage or a reactive power feedback signal that is averaged over a short time period to achieve volt and VAR control ability.

16. The system of claim 1 further comprising one or more parallel DER inverters, wherein the ANN control system mitigates fighting among the parallel DER inverters in autonomous volt/VAR control conditions.

\* \* \* \* \*